US012676870B2

(12) United States Patent
Prabhu

(10) Patent No.: US 12,676,870 B2
(45) Date of Patent: Jul. 7, 2026

(54) CONTROLLED DISPERSED ARCHITECTURE FOR THREAT PREVENTION IN SOFTWARE DEFINED NETWORKS

(71) Applicant: NOKIA SOLUTIONS AND NETWORKS OY, Espoo (FI)

(72) Inventor: Shailesh Prabhu, Manipal (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 179 days.

(21) Appl. No.: 18/654,643

(22) Filed: May 3, 2024

(65) Prior Publication Data

US 2025/0343803 A1 Nov. 6, 2025

(51) Int. Cl.
*H04L 9/40* (2022.01)
*H04L 41/046* (2022.01)
*H04L 41/0895* (2022.01)

(52) U.S. Cl.
CPC ........ *H04L 63/1416* (2013.01); *H04L 41/046* (2013.01); *H04L 41/0895* (2022.05)

(58) Field of Classification Search
CPC ............... H04L 63/1416; H04L 41/046; H04L 41/0895
See application file for complete search history.

(56) References Cited

U.S. PATENT DOCUMENTS 12,132,267 B1 * 10/2024 Duong ................. H04W 24/02
12,141,675 B1 * 11/2024 Duong ................... H04B 7/024

12,143,941 B1 * 11/2024 Duong .................... H04W 4/40
12,185,134 B1 * 12/2024 Duong .................. H04W 24/02
12,395,413 B1 * 8/2025 Rajamanickam ....... H04L 45/04
12,411,727 B1 * 9/2025 Sarkar ................. G06F 11/0709
2006/0036670 A1 * 2/2006 Musman ............... H04L 41/046
709/202
2016/0373474 A1 12/2016 Kapil
2017/0078176 A1 * 3/2017 Lakshmikantha .. H04L 43/0852
(Continued)

OTHER PUBLICATIONS

"Protecting SDN and NFV Networks from Cyber Security Vulnerabilities" https://walkerfirst.com/uploads/files/literature/Telco_Protecting_SDN_and_NFV_Networks.pdf.

*Primary Examiner* — Richard G Keehn
(74) *Attorney, Agent, or Firm* — Kramer & Amado, P.C.

(57) ABSTRACT

A method of life-cycle management for a threat-detectionagent at a network gateway node includes providing an SDN including a data plane, control plane, and an application layer including a threat-detection-agent life-cycle-management-block, deploying, by the threat-detection-agent life-cycle-management-block, a threat-detection-agent, receiving, by the threat-detection-agent life-cycle-managementblock a health-statistics report from the threat-detectionagent, determining, by the threat-detection-agent life-cyclemanagement-block based on the health-statistics report, whether first threat-detection-agent has failed, and deploying, by the threat-detection-agent life-cycle-managementblock, another threat-detection-agent, subsequent to determining that the threat-detection-agent has failed. The method may terminate the threat-detection-agent. Life-cycle management method may be applied to a threat-detectionagent deployed in the control plane.

24 Claims, 10 Drawing Sheets

(56)  References Cited

U.S. PATENT DOCUMENTS

| | | | | |
|---|---|---|---|---|
| 2018/0234454 | A1* | 8/2018 | Aggarwal | H04L 63/1458 |
| 2021/0126927 | A1* | 4/2021 | Sundararajan | H04L 63/1416 |
| 2021/0409429 | A1 | 12/2021 | Dmitriy | |
| 2022/0191224 | A1 | 6/2022 | Mika | |
| 2022/0272117 | A1* | 8/2022 | Maheve | H04L 63/1416 |
| 2023/0123781 | A1 | 4/2023 | Kaimal | |
| 2023/0370485 | A1 | 11/2023 | Dmitriy | |
| 2024/0031265 | A1* | 1/2024 | Sui | H04L 43/06 |
| 2024/0040381 | A1* | 2/2024 | Kim | H04W 12/121 |

* cited by examiner

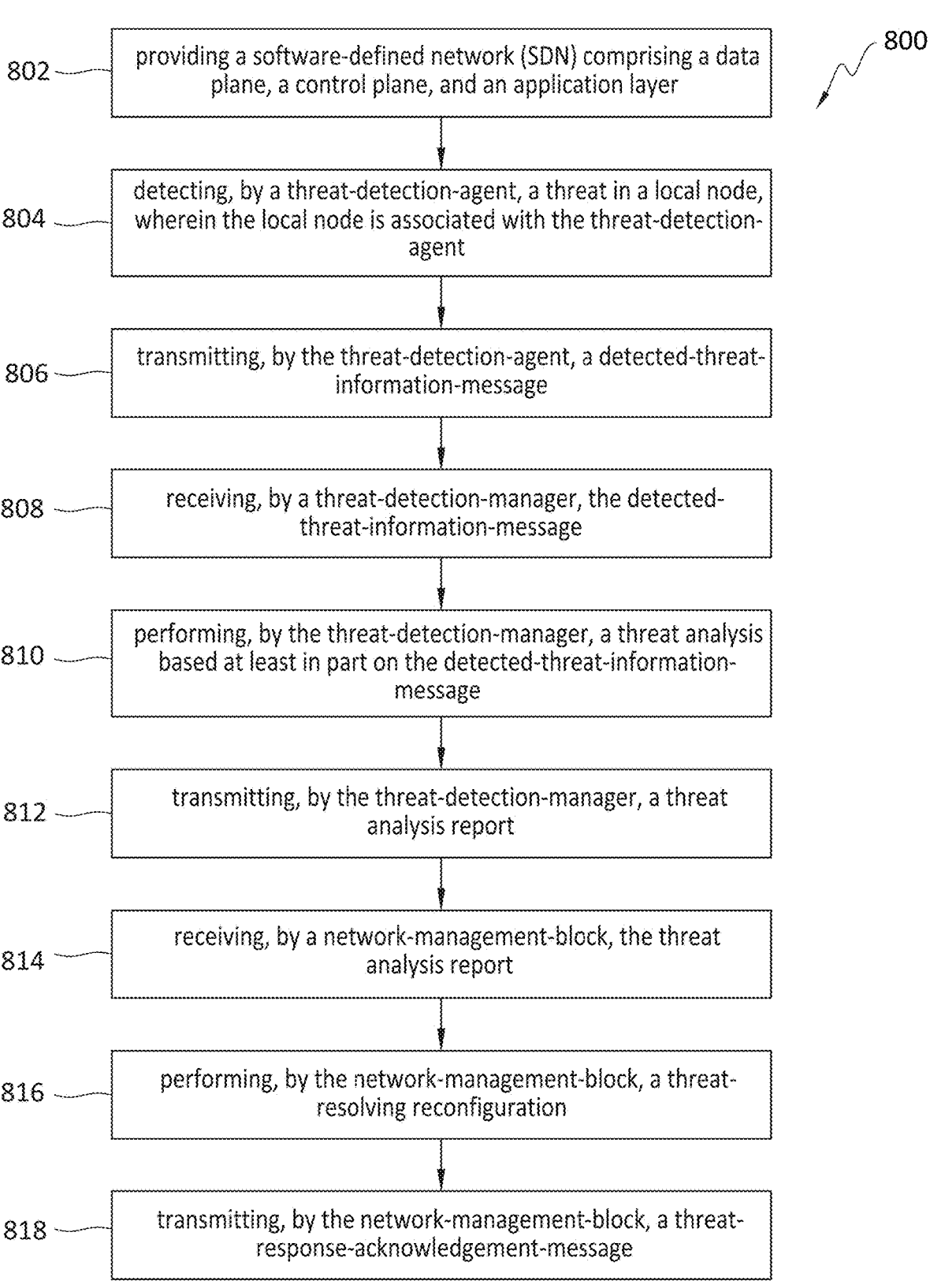

802 — providing a software-defined network (SDN) comprising a data plane, a control plane, and an application layer 804 — detecting, by a threat-detection-agent, a threat in a local node, wherein the local node is associated with the threat-detection-agent 806 — transmitting, by the threat-detection-agent, a detected-threat-information-message 808 — receiving, by a threat-detection-manager, the detected-threat-information-message 810 — performing, by the threat-detection-manager, a threat analysis based at least in part on the detected-threat-information-message 812 — transmitting, by the threat-detection-manager, a threat analysis report 814 — receiving, by a network-management-block, the threat analysis report 816 — performing, by the network-management-block, a threat-resolving reconfiguration 818 — transmitting, by the network-management-block, a threat-response-acknowledgement-message

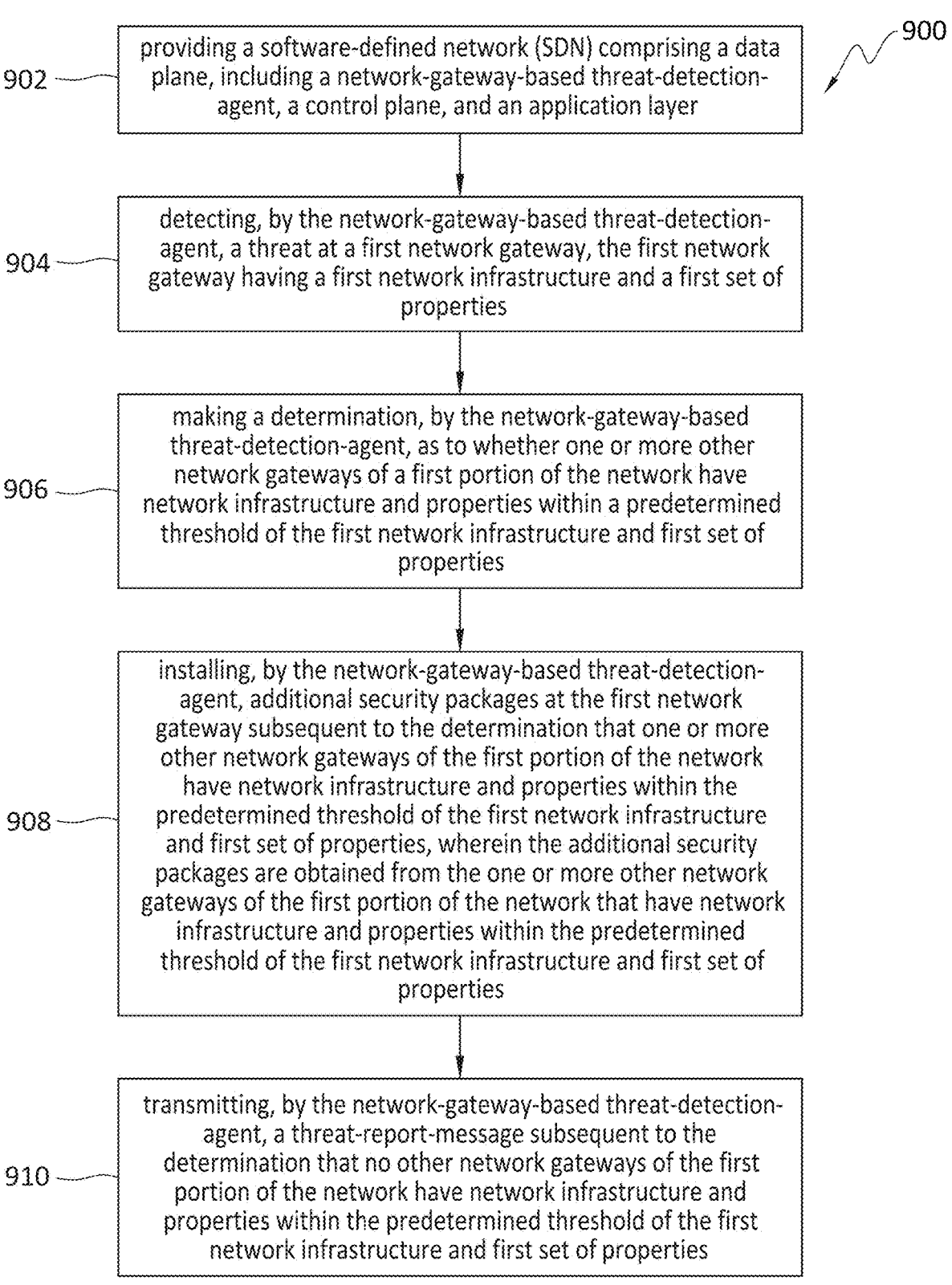

902 — providing a software-defined network (SDN) comprising a data plane, including a network-gateway-based threat-detection-agent, a control plane, and an application layer 904 — detecting, by the network-gateway-based threat-detection-agent, a threat at a first network gateway, the first network gateway having a first network infrastructure and a first set of properties 906 — making a determination, by the network-gateway-based threat-detection-agent, as to whether one or more other network gateways of a first portion of the network have network infrastructure and properties within a predetermined threshold of the first network infrastructure and first set of properties 908 — installing, by the network-gateway-based threat-detection-agent, additional security packages at the first network gateway subsequent to the determination that one or more other network gateways of the first portion of the network have network infrastructure and properties within the predetermined threshold of the first network infrastructure and first set of properties, wherein the additional security packages are obtained from the one or more other network gateways of the first portion of the network that have network infrastructure and properties within the predetermined threshold of the first network infrastructure and first set of properties 910 — transmitting, by the network-gateway-based threat-detection-agent, a threat-report-message subsequent to the determination that no other network gateways of the first portion of the network have network infrastructure and properties within the predetermined threshold of the first network infrastructure and first set of properties

CONTROLLED DISPERSED ARCHITECTURE FOR THREAT PREVENTION IN SOFTWARE DEFINED NETWORKS

FIELD OF THE DISCLOSURE

Various exemplary embodiments disclosed herein relate to threat detection and prevention in software-defined networks.

BACKGROUND

Advances in semiconductor manufacturing technology and digital communication designs have helped to enable great increases in the traffic-carrying capacity of packet-switched networks. At least partly in view of the capabilities and features of modern digital communication networks, these networks have been widely adopted, and now form an integral part of both wired and wireless communications and data transfers.

Unfortunately, the widespread adoption of these important networks has attracted the attention of bad actors that misuse these networks for unauthorized access to information storage and computational resources attached to the networks. Consequently, it has become necessary to detect and to the extent possible prevent unauthorized access, sometimes referred to as intrusions or attacks, to network-connected resources.

SUMMARY

A summary of various illustrative embodiments is presented below.

According to an aspect of this disclosure, a method of life-cycle management for a threat-detection-agent at a network gateway node, includes providing a software-defined network (SDN) that includes a data plane, a control plane, and an application layer that includes a threat-detection-agent life-cycle-management-block. The method of life-cycle management for a threat-detection-agent at a network gateway node further includes deploying, by the threat-detection-agent life-cycle-management-block, a first threat-detection-agent, and further includes receiving, by the threat-detection-agent life-cycle-management-block a health-statistics report from the first threat-detection-agent. The method of life-cycle management for a threat-detection-agent at a network gateway node still further includes making a determination, by the threat-detection-agent life-cycle-management-block based at least in part on the health-statistics report, whether the first threat-detection-agent has experienced a failure; and deploying, by the threat-detection-agent life-cycle-management-block, a second threat-detection-agent, subsequent to the determination that the threat-detection-agent has experienced a failure.

In some embodiments, the first threat-detection-agent is deployed to an SDN controller.

In some embodiments, the first threat-detection-agent is deployed to a network gateway.

In some embodiments, the method further includes receiving, by the threat-detection-agent life-cycle-management-block of the application layer, a deployment status report from the first threat-detection-agent.

In some embodiments, the method further includes terminating, by the threat-detection-agent life-cycle-management-block, the first threat-detection-agent.

According to another aspect of this disclosure, a method of performing threat management for a network having a distributed threat-detection framework, includes providing a software-defined network (SDN) including a data plane, including a threat-detection-agent, a control plane, and an application layer, including a threat-detection-manager and a network-management-block. This method may further include detecting, by the threat-detection-agent, a threat in a local node, wherein the local node is associated with the threat-detection-agent. This method further includes transmitting, by the threat-detection-agent, a detected-threat-information-message, receiving, by the threat-detection-manager, the detected-threat-information-message, and performing, by the threat-detection-manager, a threat analysis based at least in part on the detected-threat-information-message. The method further includes transmitting, by the threat-detection-manager, a threat analysis report, receiving, by the network-management-block, the threat analysis report, and performing, by the network-management-block, a threat-resolving reconfiguration, and transmitting, by the network-management-block, a threat-response-acknowledgement-message.

In some embodiments, the detected-threat-information-message is transmitted over a first control channel to an SDN controller, and the SDN controller transmits the detected-threat-information-message over a second control channel to the threat-detection-manager.

In some embodiments, the threat-detection-manager operates within the application layer of the SDN.

In some embodiments, an SDN controller operates within the control plane of the SDN, the threat-detection-manager operates within an application layer of the SDN, and the network-management-block operates within the application layer of the SDN.

In some embodiments, the method of performing threat management for a network having a distributed threat-detection framework further includes receiving, by the threat-detection-agent, the threat-response-acknowledgement-message.

According to a further aspect of this disclosure, a method of security enhancement for a network gateway in a network having a distributed threat-prevention framework, includes providing a software-defined network (SDN) that includes a data plane, including a network-gateway-based threat-detection-agent, a control plane, and an application layer. This method further includes detecting, by the network-gateway-based threat-detection-agent, a threat at a first network gateway, the first network gateway having a first network infrastructure and a first set of properties, and making a determination, by the network-gateway-based threat-detection-agent, as to whether one or more other network gateways of a first portion of the network have network infrastructure and properties within a predetermined threshold of the first network infrastructure and first set of properties. Further, the method includes installing, by the network-gateway-based threat-detection-agent, additional security packages at the first network gateway subsequent to the determination that one or more other network gateways of the first portion of the network have network infrastructure and properties within the predetermined threshold of the first network infrastructure and first set of properties, wherein the additional security packages are obtained from the one or more other network gateways of the first portion of the network that have network infrastructure and properties within the predetermined threshold of the first network infrastructure and first set of properties, and transmitting, by the network-gateway-based threat-detection-agent, a threatreport-message subsequent to the determination that no other network gateways of the first portion of the network have network infrastructure and properties within the predetermined threshold of the first network infrastructure and first set of properties.

In some embodiments, the method of security enhancement for a network gateway in a network having a distributed threat-prevention framework further includes receiving, by a threat-detection-manager, the threat-report-message, and making a determination, by the threat-detection-manager, as to whether one or more other network gateways of a second portion of the network have network infrastructure and properties within a predetermined threshold of the first network infrastructure and first set of properties.

In some embodiments, the method further includes installing, by the threat-detection-manager, one or more additional security packages at the first network gateway subsequent to the determination that one or more other network gateways of the second portion of the network have network infrastructure and properties within the predetermined threshold of the first network infrastructure and first set of properties, wherein the one or more additional security packages are obtained from the one or more other network gateways of the second portion of the network that have network infrastructure and properties within the predetermined threshold of the first network infrastructure and first set of properties.

In some embodiments, the first network gateway is a physical network gateway.

In some embodiments, the first network gateway is a virtual network gateway.

According to a further aspect of this disclosure, a software-defined-network (SDN) includes a data plane including one or more network gateways, a control plane including one or more SDN controllers, wherein at least a first portion of the one or more network gateways are communicatively coupled to a first one of the one or more SDN controllers, and each SDN controller of the one or more SDN controllers is communicatively coupled to a controller-based threat-detection-agent, and an application layer, including a threat-management-block, wherein the threat-management-block is communicatively coupled to at least one of the one or more SDN controllers, wherein a network-gateway-based threat-detection-agent is communicatively coupled to the one or more network gateways.

In some embodiments of the SDN, at least a portion of the one or more network gateways are physical network gateways.

In some embodiments of the SDN, at least a portion of the one or more network gateways are virtual network gateways.

In some embodiments of the SDN, the threat-management-block includes a threat-detection-manager.

In some embodiments of the SDN, the threat-management-block further includes a threat-detection-agent-life-cycle-management-block.

According to a further aspect of this disclosure, a non-transitory computer-readable medium including instructions to enable provision of a software-defined network (SDN) having a distributed threat-prevention framework, the instructions when executed by a processor cause the processor to: configure a network having a plurality of network gateways in a data plane of the network, one or more SDN-controllers in a control plane of the network, and a threat-management-block in an application layer of the network, instantiate, within the data plane of the network, at least one network-gateway-based threat-detection-agent that is associated with at least a first one of the plurality of network gateways, and instantiate, within a control plane of the network, at least one SDN-controller-based threat-detection-agent that is associated with at least a first one of the one or more SDN-controllers, wherein the at least one network-gateway-based threat-detection-agent is configured to detect threats and coordinate information within the data plane, and the at least one SDN-controller-based threat-detection-agent is configured to detect threats and coordinate information within the control plane.

In some embodiments, of the non-transitory computer-readable medium including instructions to enable provision of a software-defined network (SDN) having a distributed threat-prevention framework, at least a first one of the one or more SDN-controllers manages, controls, and provisions a data plane with a set of application-layer services.

In some embodiments of the non-transitory computer-readable medium including instructions to enable provision of a software-defined network (SDN) having a distributed threat-prevention framework, the threat-management-block manages the at least one SDN-controller-based threat-detection-agent, and manages the at least one network-gateway-based threat-detection-agent.

In some embodiments of the non-transitory computer-readable medium including instructions to enable provision of a software-defined network (SDN) having a distributed threat-prevention framework, the threat-management-block includes a threat-detection-agent-life-cycle-management-block, and further includes a threat-detection-manager.

In some embodiments of the non-transitory computer-readable medium including instructions to enable provision of a software-defined network (SDN) having a distributed threat-prevention framework, the threat-detection-agent-life-cycle-management-block is configured to receive, from at least one control channel, health statistics from the at least one network-gateway-based threat-detection-agent.

BRIEF DESCRIPTION OF DRAWINGS

To better understand various illustrative embodiments, reference is made to the accompanying drawings, wherein:

FIG. 8 is a flow diagram illustrating a method of performing threat management for a network having a distributed threat-detection framework;

FIG. 9 is a flow diagram illustrating a method of security enhancement for a network gateway in a network having a distributed threat-prevention framework.

To facilitate understanding, identical reference numerals have been used to designate elements having substantially the same or similar structure and/or substantially the same or similar function.

DETAILED DESCRIPTION

Figure 1:
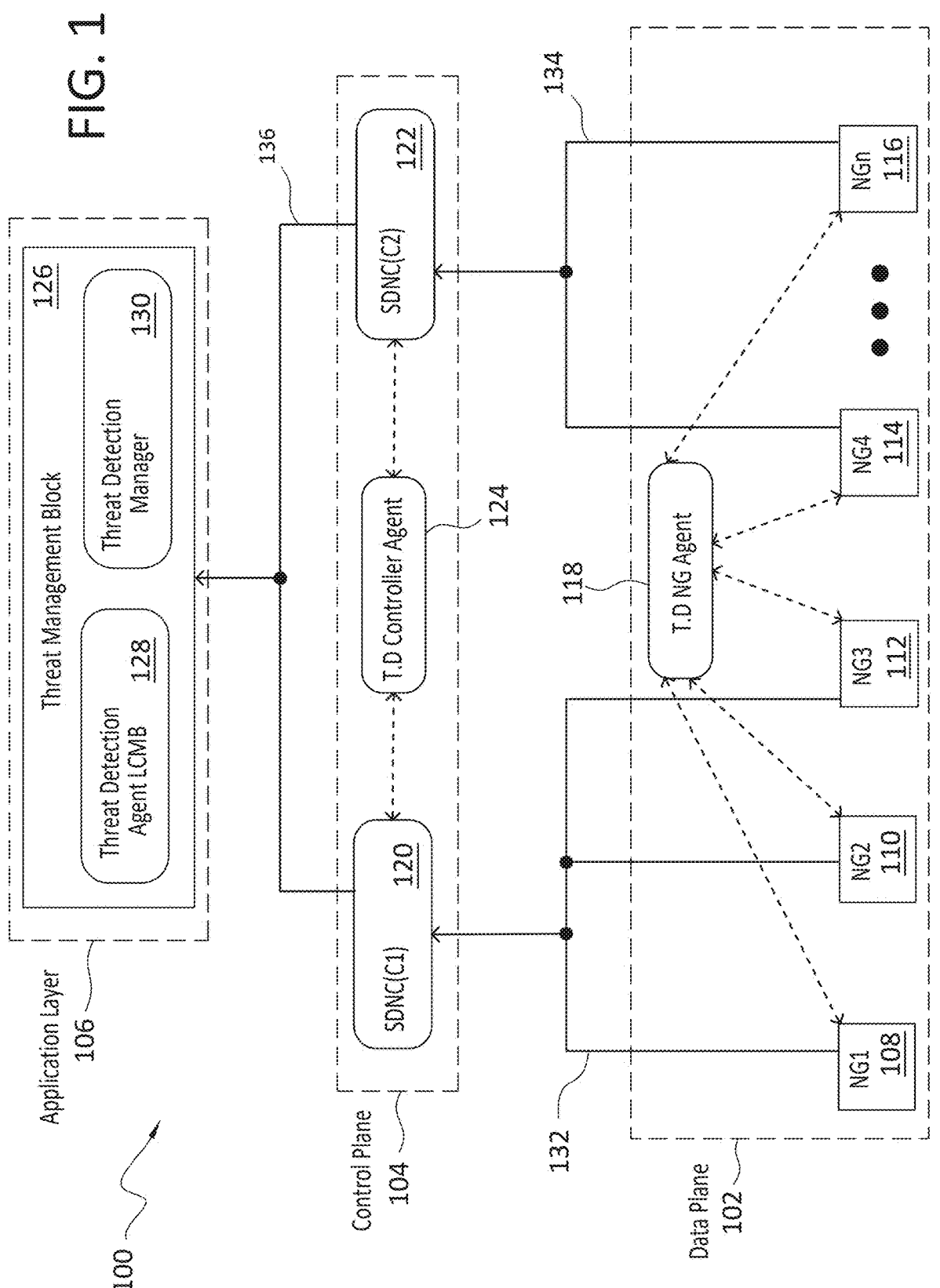
FIG. 1 is a high-level system diagram of an SDN architecture having an application-layer threat-management-block, and threat-detection-agents distributed throughout the control plane and data plane, in accordance with this disclosure.

Generally, traditional software-defined networking is a network architecture that separates the control plane from the data plane in networking devices, thereby enabling centralized management and control of network resources through software-based controllers. Software-defined network (SDN) architectures may provide, for example, flexibility, programmability, and scalability, by abstracting network functionality from underlying hardware and allowing automated network configuration and management.

Traditional SDN architectures may have a central threat management system to manage threats and configure/deploy security services in the SDN networks. However, due to the dynamic nature of such SDN networks, critical threat responses and configuration messages may get dropped due to a variety of reasons such as, but not limited to, control channel failures, node failures, etc. Also, for mission-critical use cases, the decisions taken by a central threat management system may cause a delay in responses.

Various embodiments in accordance with this disclosure provide a distributed threat detection/prevention framework that deploys threat-detection agents at various locations in an SDN to make local security configurations pertaining to the nodes. The threat management framework is also made reliable in its operations by using a central block to perform life cycle management of all threat detection agents across the network. Various embodiments in accordance with this disclosure may reduce the threat response time, and strengthen security at vulnerable access networks. In some embodiments, the SDN is a software-defined wide area network (SD-WAN). Various embodiments, in accordance with distributed threat-detection and prevention framework of this disclosure, enable networks, such as for example, SDNs and SD-WANs to make quick security adjustments and/or configurations across the network.

It is noted that, while various software-defined networks in accordance with this disclosure may consist entirely of physical switches, gateways, controllers, and so on, other software-defined networks in accordance with this disclosure may have a data plane with virtual switching and routing components, a control plane with virtualized controllers, and an application layer with virtualized services. SDN-controllers perform logical operations on digital data, and may be implemented as logic circuits or as computational resources that execute non-transitory instructions that cause the computational resources to perform logical operations.

Threat-detection-agents are essentially tools, or components, that monitor and identify potential security threats within a computer system, network, or software application. Threat-detection-agents perform logical operations on digital data, and may be implemented as logic circuits or as computational resources that execute non-transitory instructions that cause the computational resources to perform logical operations. These agents play a role in cybersecurity by frequently, or continuously, analyzing, for example, system activities, network traffic, and user behaviors to detect suspicious or malicious activities that could indicate a security breach or compromise.

Various aspects of this disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

An SDN typically consists of a network-virtualization-overlay with one or more logically centralized controllers managing an IP-based underlay. The term, IP-based, refers to the internet protocol, and its well-known addressing arrangements for directing datagrams (i.e., packages of bits) between hosts attached to a network. For example, IPv4 uses 32-bit addressing, and IPV6 uses 128-bit addressing. Regardless of the typical use of an IP-based underlay, various embodiments in accordance with this disclosure are not limited to any particular addressing scheme for sending datagrams between hosts.

In large enterprise networks, the end devices (e.g., users) are logically connected to several network gateways to leverage the virtualized services offered by the network with the help of SDN controllers. In this way, an SDN architecture is logically divided into a data plane (consisting of routing and switching devices), a control plane (consisting of SDN controllers), and an application (i.e., management) layer.

Communication of control and data messages between these layers (e.g., between the control plane and the data plane) of a software-defined network occurs through the control channels. For example, the data plane may communicate with an SDN Controller using a predetermined protocol, such as but not limited to the OpenFlow protocol. The OpenFlow switch protocol describes the communication between an OpenFlow switch and an OpenFlow controller. (See, for example, OpenFlow Switch Specification Version 1.5.1 (Protocol version 0x06) from the Open Networking Foundation.)

In various embodiments that use the OpenFlow protocol, a control channel refers to the aggregation of components of an OpenFlow logical switch that manages communication with controllers. The control channel includes one OpenFlow channel per OpenFlow controller. Additionally, a connection in the OpenFlow protocol refers to a network connection that carries OpenFlow messages between a switch and a controller, it may be implemented using various network transport protocols. An OpenFlow channel has a main connection, and optionally a number of auxiliary connections.

It is noted that the physical implementation of control channels may include fiber optic cables, electrically conductive cables, wireless communication paths, or any combination of the foregoing.

The application layer communicates with the SDN controller typically through XMPP messages. Any failure in the control channels will disrupt the communication between the corresponding nodes (using the failed control channel).

It is noted that XMPP refers to the Extensible Messaging and Presence Protocol, which is an open communication protocol designed for instant messaging, presence information, and contact list maintenance. The core specifications for XMPP are developed at the Internet Engineering Task Force (IETF). The XMPP Standards Foundation (also known as the XSF, and formerly the Jabber Software Foundation) is an independent, nonprofit standards development organization that defines open protocols for presence, instant messaging, and real-time communication and collaboration on top of the IETF's XMPP.

With the advent of 5G networks and beyond, user density is expected to be very high. Accordingly, the serving (software-defined) network is expected to receive a commensurately large traffic flow. As the network grows, it is increasingly susceptible to threats and intrusions. Detecting and resolving threats dynamically in a large network is a challenge that exists today. In existing large enterprise networks, the threat detection/prevention services deployed at several (thousands) network gateways operate independently, without coordination of useful threat-related information among those network gateways. In addition to this, there is a lack of local threat-detection systems that can provide quicker threat responses compared to the central Threat-Management systems that exist today. This approach of having only a centralized Threat Coordinator/Manager may lead to the problems set forth below.

One issue with centralized threat management is that in cases of control channel failures, the threat requests/responses may fail due to communication breakage. As a result, the central Threat Manager may not be able to make critical security configurations related to the network, until the control channel is up again.

Another issue with centralized threat management is that since all the threat-related messages are sent to a central Threat Manager residing in the Application layer, this may consume backhaul bandwidth if the Application layer resides in a remote/cloud location.

A further issue with centralized threat management is that time-critical decisions (for mission-critical use cases) may get delayed since security configurations happen at the central level.

A distributed threat-detection/prevention framework, in accordance with this disclosure, may address the above-identified issues by adaptively detecting and resolving threats in large and dynamic networks.

Various embodiments in accordance with this disclosure provide a distributed threat prevention framework wherein threat detection agents are deployed across the network, at various node locations, to make quick security configuration local to the node.

Various embodiments in accordance with this disclosure provide a central threat-detection-agent-life-cycle-management block, residing in the application layer, to perform life cycle management of threat detection agents based at various nodes in the network.

Various embodiments in accordance with this disclosure provide methods to locally deploy/configure security configurations by the threat-detection-agents. By fetching information locally for performing a configuration operation, the threat-detection-agent may perform that configuration operation without having to take the time that would otherwise be needed to communicate with an upper layer threat-detection-manager. In some of these methods, the threat-detection-agent, after determining that assistance from an upper layer of the network is required to properly configure the local node, reports the determination to the upper layer, essentially requesting the support of the upper layer (e.g., the central threat-detection-manager) to properly configure the local node associated with the requesting threat-detection-agent. It is noted that the determination of needing assistance from the upper layer may be referred to herein as a decision.

Various methods, in accordance with this disclosure, may strengthen security in vulnerable access networks by fetching useful information via local threat-detection-agents. In accordance with this disclosure, an architecture is provided for threat detection and prevention in software-defined-networks. Various embodiments adaptively strengthen security at vulnerable network sites by leveraging information present in Threat Detection Agents deployed at various nodes and layers of SDN FIG. 1 is a high-level system diagram of an illustrative SDN architecture having an application-layer threat-management-block, and threat-detection-agents distributed throughout the control plane and data plane of the SDN. As shown in FIG. 1, SDN architecture 100 includes a data plane 102, a control plane 104, and an application layer 106. In this illustrative embodiment, data plane 102 includes network gateways 108, 110, 112, 114, 116. Network gateways in the illustrative software-defined-network are the "last mile" access gateways to which the users logically connect to access various services offered by the network.

Data plane 102 further includes at least one network-gateway-based threat-detection-agent 118. Each of network gateways 108, 110, 112, 114, 116 is communicatively coupled to a network-gateway-based threat-detection-agent. In this illustrative embodiment, network gateways 108, 110, 112, 114, 116 are each communicatively coupled to network-gateway-based threat-detection-agent 118. Network-gateway-based threat-detection-agent 118 is deployed to the network gateways at the data plane to detect threats and coordinate information within the data plane.

It is noted that data plane 102 may have more or fewer network gateways than that which are shown in this illustrative embodiment. It is further noted that each of network gateways 108, 110, 112, 114, 116 may be a physical network gateway, or a virtual network gateways. Thus data plane 102 may include all physical network gateways, all physical network gateways, or a combination of physical network gateways and virtual network gateways.

Still referring to FIG. 1, control plane 104 includes a first SDN controller 120, a second SDN controller 122, and at least one SDN-controller-based threat-detection-agent 124. Each SDN controller is communicatively coupled to an SDN-controller-based threat-detection-agent. In this illustrative embodiment, first SDN controller 120, and second SDN controller 122, are each communicatively coupled to SDN-controller-based threat-detection-agent 124. It is noted that control plane 104 may have more or fewer SDN controllers than shown in this illustrative embodiment. In this illustrative embodiment, an SDN controller is a centralized authority that manages, controls, and provisions the data plane with application-layer services. SDN-controller-based threat-detection-agent 124 is deployed to the SDN controllers 120, 122 at control plane 104 to detect threats and coordinate threat-related information within control plane 104.

Still referring to FIG. 1, application layer 106 includes a threat-management-block 126. In this illustrative embodiment, threat-management-block 126 includes a threat-detection-agent life-cycle-management-block 128, and a threat-detection-manager 130. Threat-management-block 126 is a centralized block that manages the distributed threat-detection-agents in the network. Threat-detection-agent life-cycle-management-block 128 is responsible for the life cycle management of threat-detection-agents, such as for example the network-gateway-based threat-detection-agents and the SDN-controller-based threat-detection agents, from instantiation, deployment, node health monitoring, to termination of these nodes. In case of a failure of a threat-detection-agent at any stage (i.e., instantiation, deployment, node health, termination), the threat-detection-agent life-cycle-management-block re-initiates the failed procedure.

In the illustrative embodiment of FIG. 1, network gateways 108, 110, 112, are communicatively coupled to first SDN controller 120 by control channel 132, and network gateways 114, 116, are communicatively coupled to second SDN controller 122 by control channel 134. First SDN controller 120 and second SDN controller 122 are communicatively coupled to threat-management-block 126 by control channel 136. Threat-detection-manager 130 is responsible for centrally reconfiguring/protecting vulnerable networks in case one or more threats are detected at one or more nodes.

Various embodiments of software-defined networks in accordance with this disclosure may have more threat-detection-agents than shown in the illustrative embodiment of FIG. 1, and these threat-detection-agents may be distributed across the software-defined network, and may function to manage threats pertaining to various nodes and plane of the software-defined network.

Figure 2:
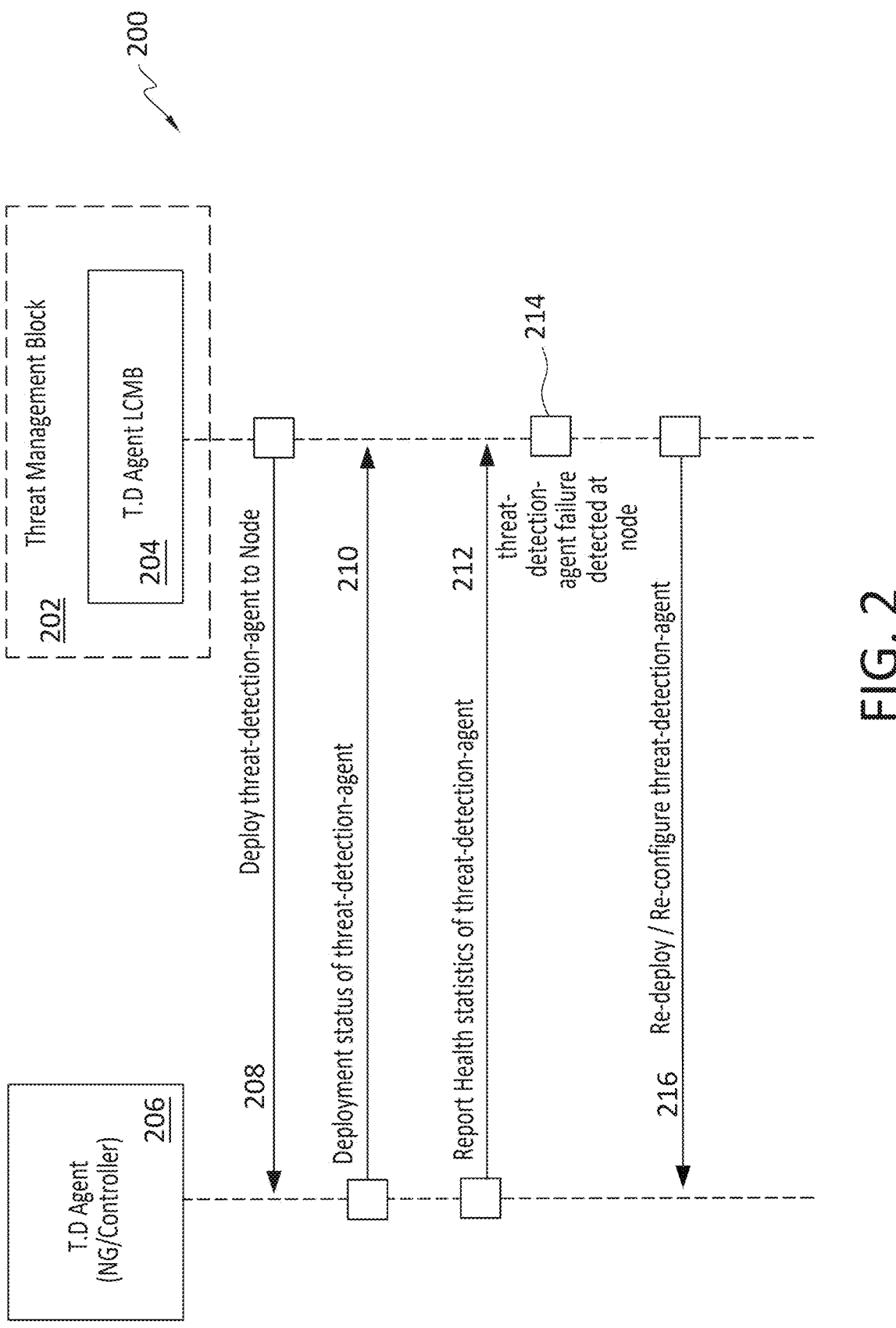
FIG. 2 is a sequence diagram illustrating life cycle management of threat-detection-agents deployed at local network gateway nodes, in accordance with this disclosure.

FIG. 2 shows a sequence diagram 200 illustrating life cycle management of threat-detection-agents deployed at local network gateway nodes, in accordance with this disclosure. The threat-detection framework in accordance with this disclosure has threat-detection-agents distributed across the networks at various locations. A threat-detection-agent may serve an entire set of nodes in a plane (e.g., data plane), or the threat-detection-agent may serve a cluster of nodes in a plane. Hence, in a large enterprise network, there are may be several threat-detection-agents located, within a plane, as well as across planes (e.g., between data plane and control plane). In order to efficiently manage the life cycle of these threat-detection-agents, embodiments in accordance with this disclosure may include a central threat-detection-agent life-cycle-management-block (LCMB) at the application layer. The threat-detection-agent LCMB deploys, instantiates, manages, modifies, and terminates the threat-detection-agents, as needed. In some embodiments, the ability of the threat-detection-agent LCMB to terminate a threat-detection-agent extends throughout the network.

In some embodiments, the threat-detection-agent LCMB periodically analyzes the health statistics of one or more threat-detection-agents, and if those health statistics indicate a failure of a threat-detection-agent, then the threat-detection-agent LCMB triggers a re-deploy/re-configure event to the node at which the failed threat-detection-agent is based. Thus, failed or failing threat-detection-agents may be terminated and replaced. One example of a health statistic is uptime. By continuing to monitor threat-detection-agents in the network for their uptime, and replacing them when a failure condition is detected, a robust threat-detection and prevention infrastructure may be maintained within a network in accordance with this disclosure.

Still referring to FIG. 2, a scenario of the central threat-detection-agent LCMB detecting and resolving a failure of a threat-detection-agent is shown. Sequence diagram 200 shows a threat-management-block 202 that includes a threat-detection-agent LCMB 204. Sequence diagram 200 further shows a threat-detection-agent deployed at node 206. It is noted that node 206 may be, for example, a network-gateway node, or an SDN-controller. As shown in sequence diagram 200, threat-detection-agent LCMB 204 deploys 208 a threat-detection-agent to node 206. Node 206 then reports 210 the deployment status of the threat-detection-agent. Node 206 subsequently reports 212 its health statistics to threat-detection-agent LCMB 204. Threat-detection-agent LCMB 204 then analyzes 214 the reported health statistics and make a determination as to whether a failure of the threat-detection-agent has occurred. Subsequently, and responsive to a determination that a failure of the threat-detection-agent has occurred, threat-detection-agent LCMB 204 performs an operation 216 to redeploy or reconfigure a threat-detection-agent to node 206.

Figure 3:
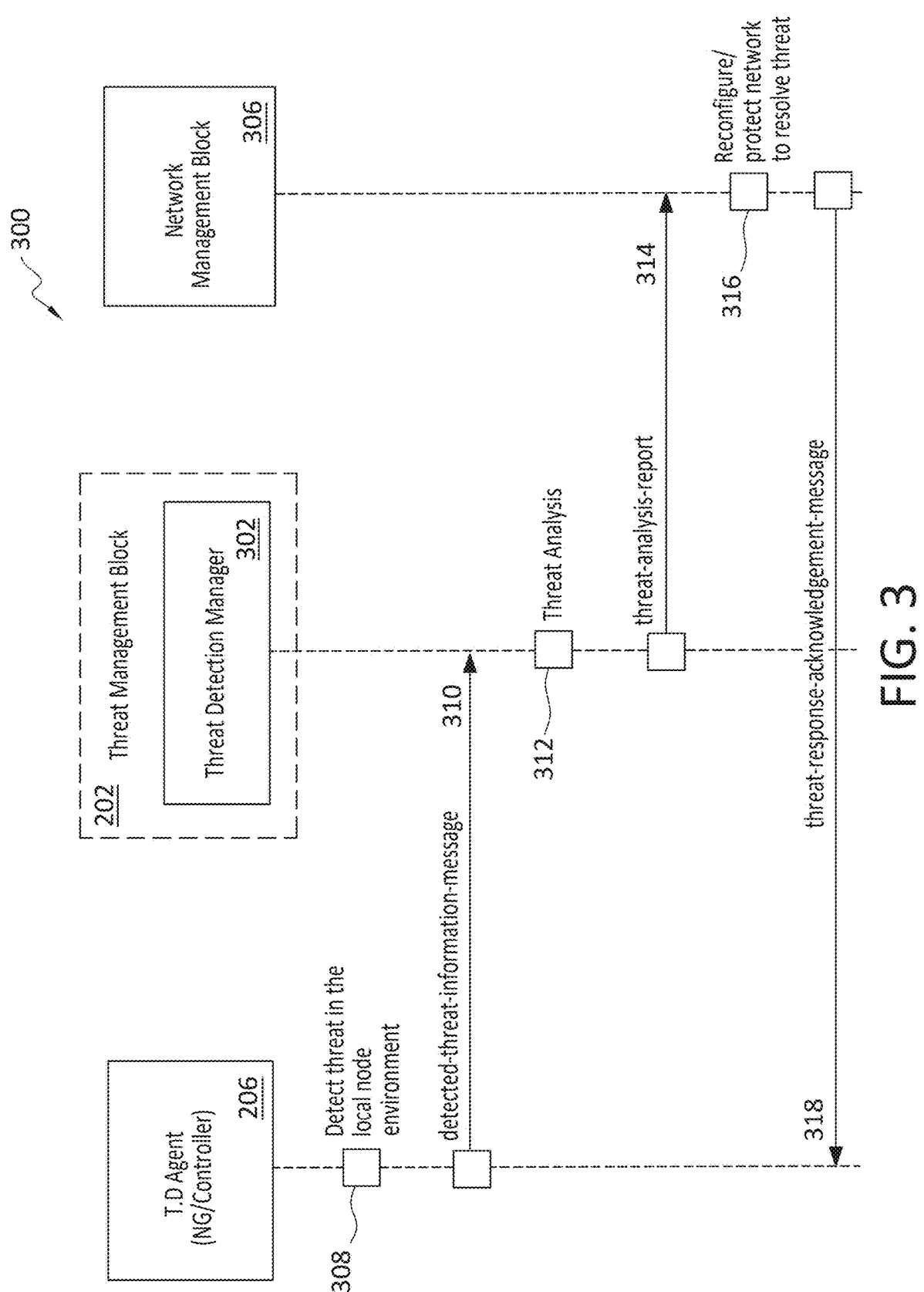
FIG. 3 is a sequence diagram illustrating threat detection and resolution by a threat-detection-manager in accordance with this disclosure.

Referring to FIG. 3, when a network-gateway-based threat-detection-agent detects a threat at a particular network gateway, then the access network of the network gateway may be considered vulnerable. In accordance with this disclosure, methods to resolve the detected threat with the help of a threat-detection-manager and a network-management-block (NMB) are provided. It may be assumed that the network gateway's access network might have more undetected threats, since the network itself is vulnerable. The current threat-prevention service at the network gateway might only detect/resolve a particular kind of threat and may not be resistant to several other threats.

FIG. 3 shows a sequence diagram 300 illustrating detection of a threat, and resolution by a threat-detection-manager, in accordance with this disclosure. A centralized threat-detection-manager and threat-detection-agent together facilitate threat detection and resolution at various local nodes where threat-detection-agents are deployed. In use cases where threat-detection-agents detect intrusions or threats in the local node environment, the central threat-detection-manager, in accordance with this disclosure, facilitates the resolution and/or prevention of these intrusions or threats by analyzing the threat and protecting and/or configuring the network (in the corresponding node). Sequence diagram 300 illustrates that the threat-detection-agent detects threats using its threat-detecting packages (services) and communicates this threat information to the threat-detection-manager. In some embodiments, this communication takes place via control channels. The threat-detection-manager then analyzes this threat information and provides a report of a possible resolution (based, for example, on its historical and holistic knowledge of the entire network) to the network-management-block (NMB). The threat-detection-manager may be pre-trained to recognize certain threats and to initiate the corresponding resolution techniques. The NMB then applies this resolution by reconfiguring the network of the node where the threat was initially detected. The threat response acknowledgment is then communicated back to the node at which the threat-detection-agent is based.

Still referring to FIG. 3, a threat management block 202 that includes a threat-detection-manager 302, a threat-detection-agent 206 (either an SDN-controller-based or network-gateway-based), and an NMB 306. Sequence diagram 300 shows detecting 308 a threat in the local node environment by threat-detection-agent 206. A detected-threat-information-message is then sent 310 from threat-detection-agent 206 to threat-detection-manager 302. A threat analysis is then performed 312 by threat-detection-manager 302. Subsequent to performing the threat analysis, a threat-analysis-report is sent 314 by threat-detection-manager 302 to NMB 306. NMB 306 determines reconfigures 316 the network to resolve the threat, and sends 318 a threat-response-acknowledgement-message to threat-detection-agent 206.

Figure 4:
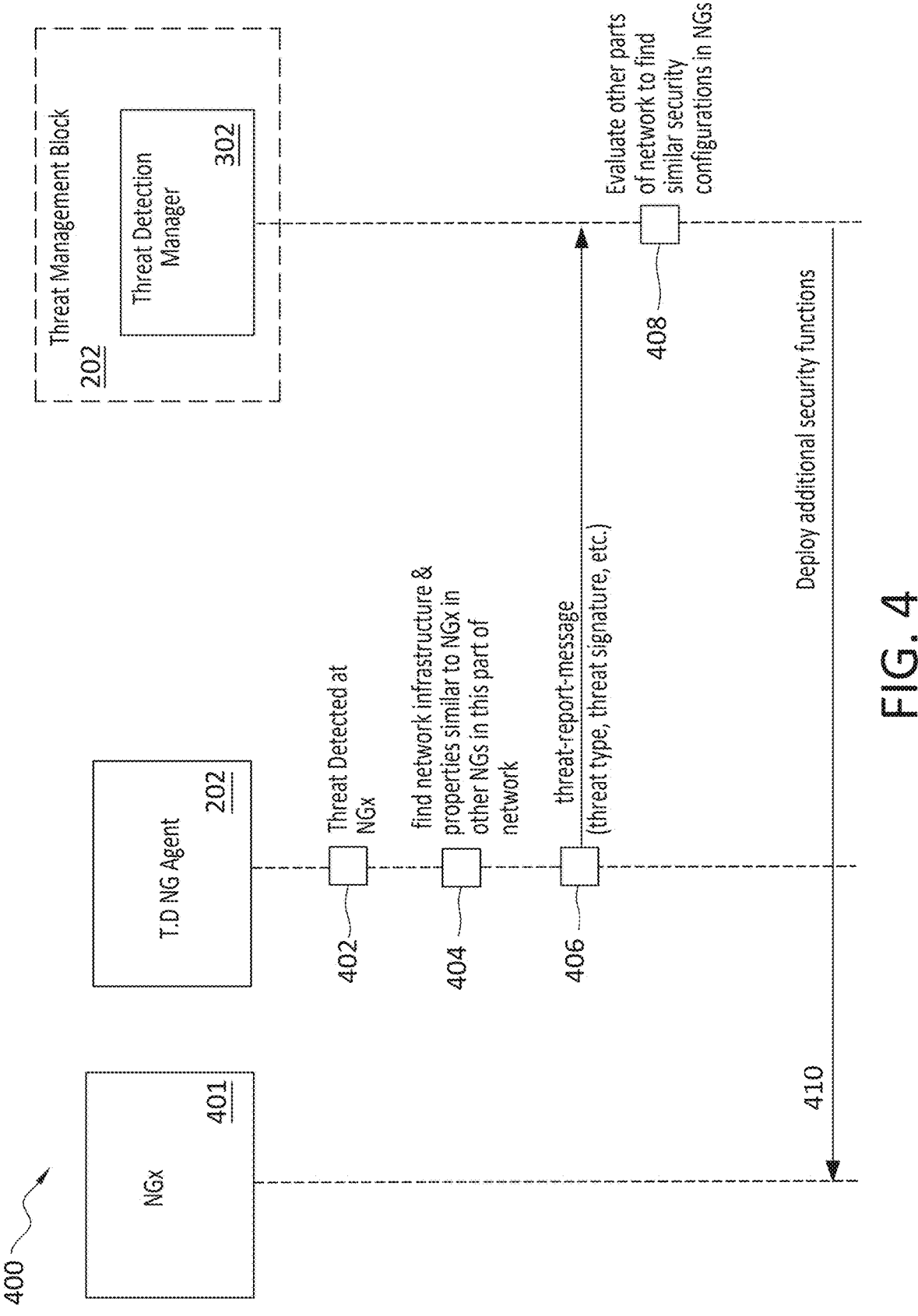
FIG. 4 is a sequence diagram illustrating threat prevention and security enhancement at a network gateway in accordance with this disclosure.

FIG. 4 is a sequence diagram illustrating a method 400 of threat prevention and security enhancement at a network gateway in accordance with this disclosure. As shown in FIG. 4, when network-gateway-based threat-detection-agent 202 detects 402 a threat in a network gateway 401, threat-detection-agent 202 first looks up 404 its smaller network to find any other network gateway with similar network infrastructure and properties. If found, threat-detection-agent 202 then installs additional security features/packages found there to the network gateway 401 at which the threat was detected. However, if a similar network gateway is not found, then threat-detection-agent 202 sends 406 a threat-report-message consisting of threat information (such as, signatures, type, etc.) to the centralized threat-detection-manager 302. Threat-detection-manager 302 then evaluates 408 the entire network (under control) to search for another network gateway that has a similar network configuration as the network gateway 401 at which the threat was detected. If a similarly configured network gateway is found in other parts of the network, security functions, packages, or services found at that similarly configured network gateway may be deployed 410 to network gateway 401, to protect the overall network.

Figure 5:
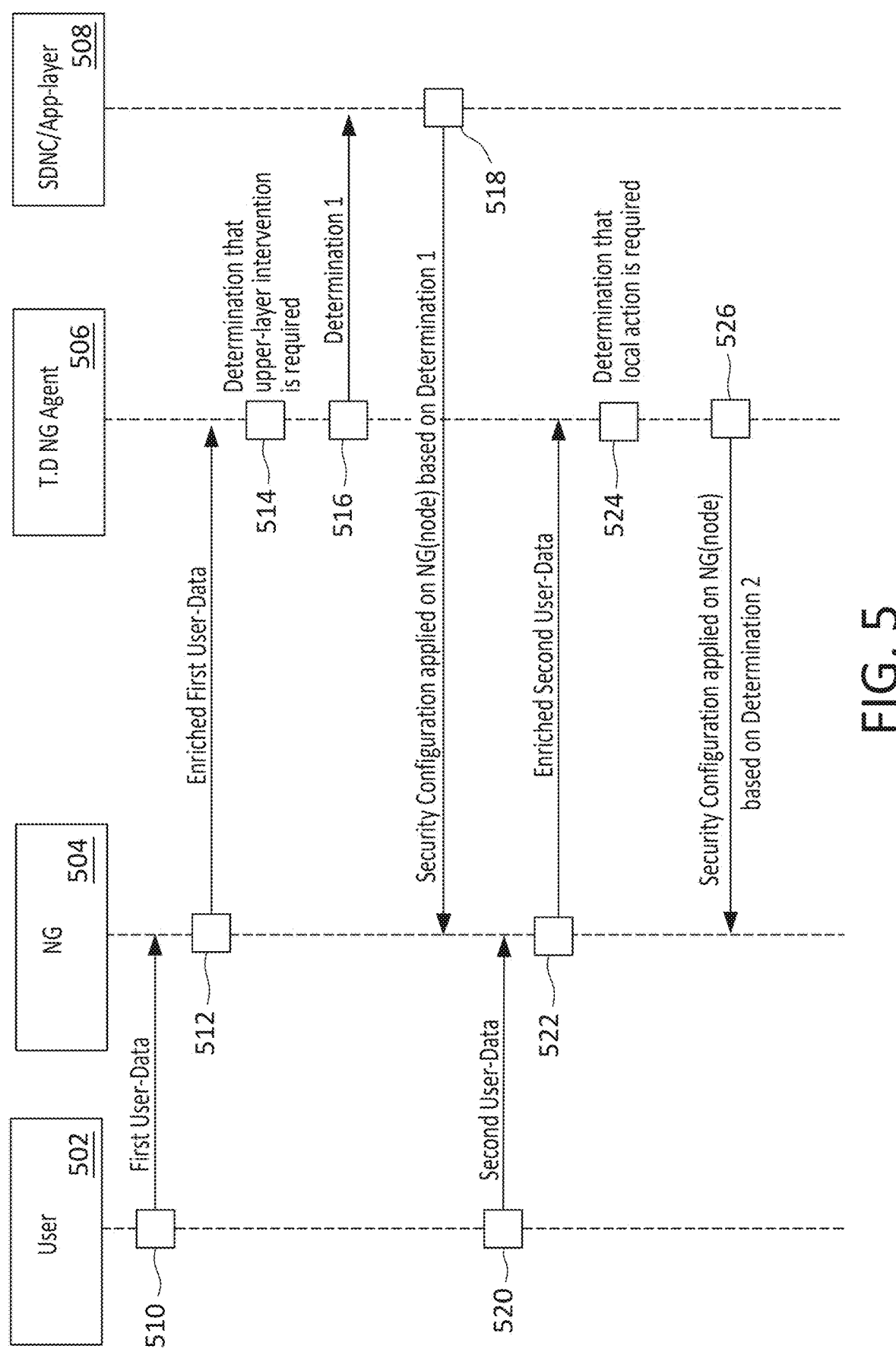
FIG. 5 is a sequence diagram illustrating a security configuration operation by a threat-detection-agent at a network gateway in accordance with this disclosure.

FIG. 5 is a sequence diagram illustrating a method of performing a security configuration operation by a threat-detection-agent at a network gateway in accordance with this disclosure. That is, in some time-critical situations, decisions that would otherwise be made at an upper-layer of the network are handled by network-gateway-based threat-detection agents in the data plane. FIG. 5 illustrates a first case in which upper-layer intervention is required to properly update the security configuration of at least one network gateway, and a second case in which upper-layer intervention is not required, but local action within the data plane is required.

Still referring to FIG. 5, in case access networks become vulnerable due to threats/attacks, relevant threat prevention services/packages are additionally deployed in network gateways either by network-gateway-based threat-detection-agents or by central threat-detection-manager. Some of the decisions related to security may require configuration changes, and policy enforcement to be made by the upper layers, for example, the control plane that includes SDN-controllers, or the application layer. Such decisions are communicated to the corresponding upper layer where the configuration needs to be done. However, some decisions, such as time-critical decisions, may be performed locally and the decision results applied to the node within the same layer. In this way, configuration changes to the network gateway may be made (with pre-authorization) by the network-gateway-based, without the intervention of the upper layers.

FIG. 5 shows a source of user data 502, a network gateway 504, a network-gateway-based threat-detection-agent 506, and an upper-layer block 508 that represents an SDN-controller or an application layer. In a first case, the source of user data 502 provides 510 first user-data to network gateway 504. Network gateway 504 then provides 512 enriched first user-data to network-gateway-based threat-detection-agent 506. Threat-detection-agent 506 then makes a first determination 514 that upper-layer intervention is required to properly update the security configuration of network gateway 504. Network-gateway-based threat-detection-agent 506 communicates its first determination to upper-layer block 508. Upper-layer block 508 then provides 518 an updated security configuration to network gateway 504.

Still referring to FIG. 5, in a second case, the source of second user-data 502 provides 520 second user-data to network gateway 504. Network gateway 504 then provides 522 enriched second user-data to network-gateway-based threat-detection-agent 506. Threat-detection-agent 506 then determines 524 that local action is required. In this second case threat-detection-agent 506 then provides 526 an updated security configuration to network gateway 504.

Figure 6:
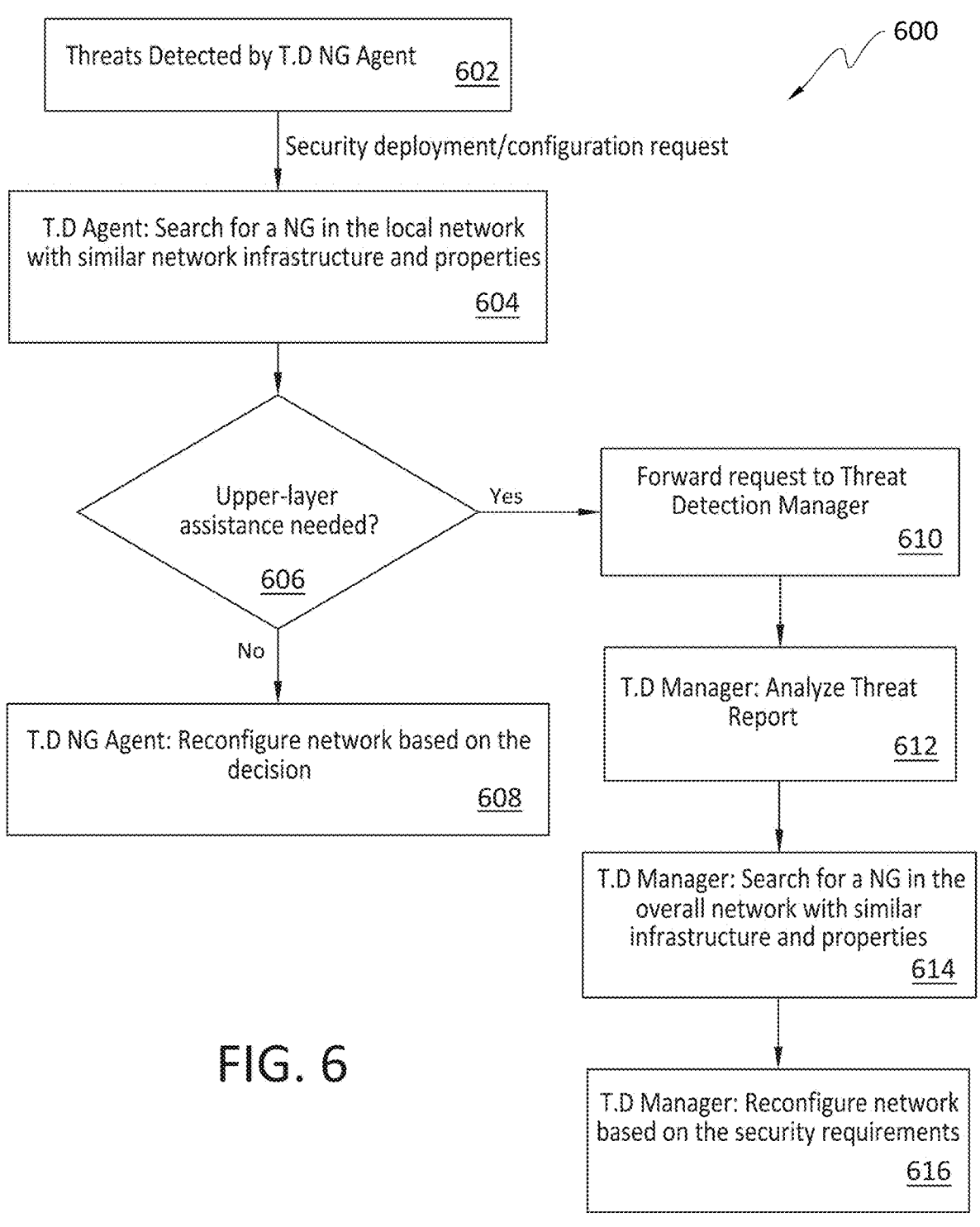
FIG. 6 is a flow chart illustrating a method of security configuration by threat-detection-agents and threat-detection managers, in accordance with this disclosure.

FIG. 6 is a flow chart illustrating a method 600 of security configuration by threat-detection-agents and threat-detection managers, in accordance with this disclosure. Method 600 includes detecting 602 one or more threats by a network-gateway-based threat-detection agent. The detection of one or more threats results in the generation of a request for the deployment of security tools to the network gateway, or for the configuration of the network gateway, or both. The network-gateway-based threat-detection-agent then searches 604 in a local network for another network gateway having network infrastructure and/or properties that are similar (i.e., within a predetermined threshold of) to the network infrastructure and/or properties of the network gateway at which the one or more threats have been detected. A decision 606 is then made based, at least in part, on whether search 604 finds a network gateway in the local network having network infrastructure and/or properties similar to the network infrastructure and/or properties of the network gateway at which the one or more threats have been detected. If search 604 finds a similar network gateway, then upper-layer (e.g., control plane or application layer) assistance is not needed and a reconfiguration 608 of the network gateway at which the one or more threats have been detected is performed. However, if search 604 does not find the above-mentioned similar network gateway, then upper-layer assistance is required, and the request for the deployment of security tools to the network gateway, or for the configuration of the network gateway, or both, is forwarded 610, via one or more control channels, to a threat-detection-manager. Method 600 continues with the threat-detection-manager analyzing 612 the reported one or more threats. In accordance with method 600, the threat-detection-manager performs a search 614 of the overall network for a network gateway having network infrastructure and/or properties that are similar to the network infrastructure and/or properties of the network gateway at which the one or more threats have been detected. Method 600 further includes reconfiguring 616 by the threat-detection manager, at least the network gateway at which the one or more threats were detected, based at least in part, on the results of search 614.

Figure 7:
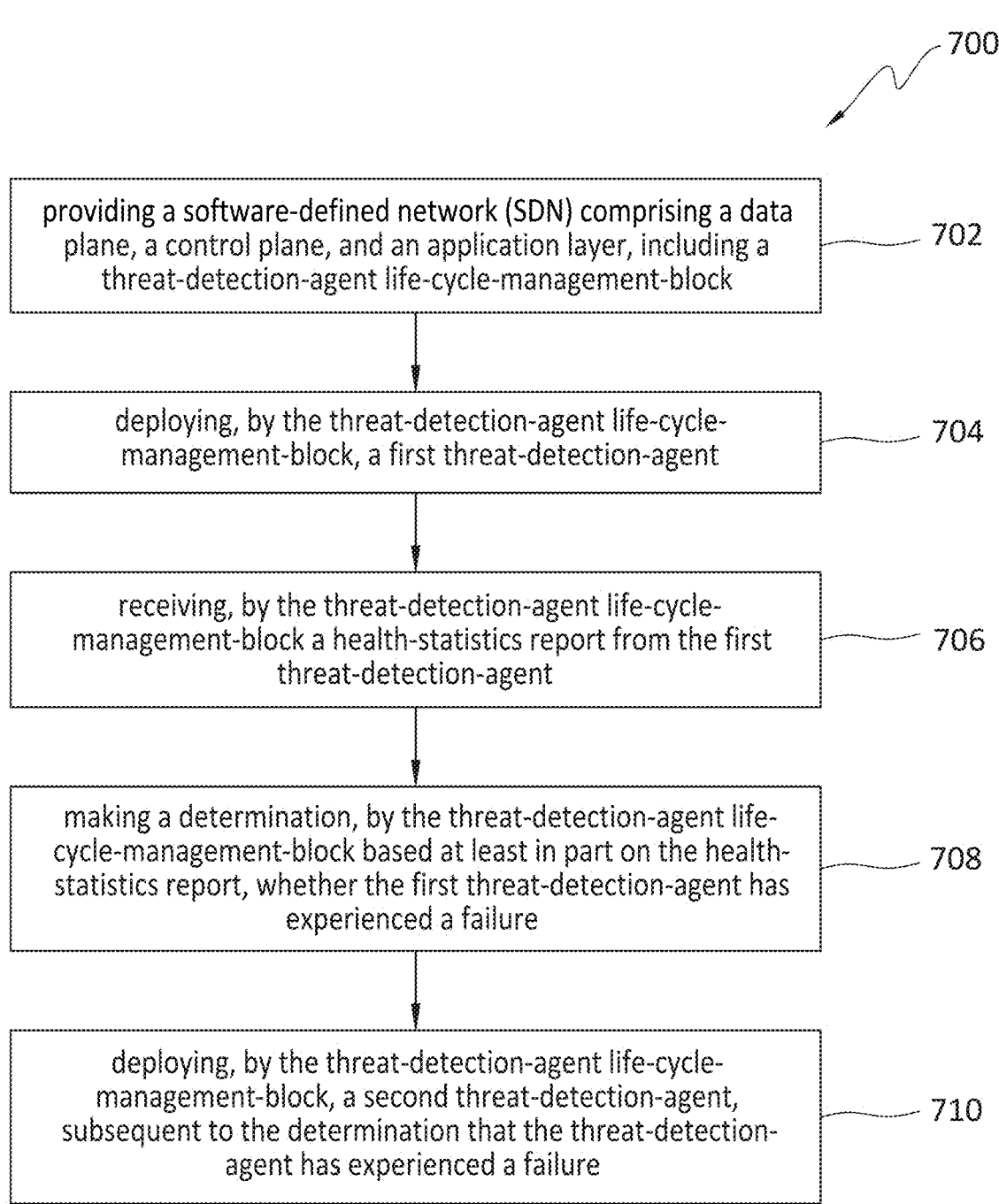
FIG. 7 is a flow diagram illustrating a method of life-cycle management for a threat-detection-agent at a network gateway node, in accordance with this disclosure.

FIG. 7 is a flow diagram illustrating a method 700 of life-cycle management for a threat-detection-agent at a network gateway node, in accordance with this disclosure. Method 700 includes providing 702, an SDN that includes a data plane, a control plane, and an application layer including a threat-detection-agent life-cycle-management-block. An SDN is typically implemented with a combination of hardware and software. By way of example, and not limitation, an SDN may include network gateways, data switches, storage devices, computational resources such as computers, and non-transitory instructions that when executed by various computational resources cause those computational resources to perform actions in accordance with method 700. An SDN may be implemented such that some of its components are virtualized rather than physical.

Method 700 further includes deploying 704, by the threat-detection-agent life-cycle-management-block, a first threat-detection-agent, and receiving 706, by the threat-detection-agent life-cycle-management-block a health-statistics report from the first threat-detection-agent. Method 700 further includes making a determination 708, by the threat-detection-agent life-cycle-management-block based at least in part on the health-statistics report, whether the first threat-detection-agent has experienced a failure. Method 700 still further includes deploying 710, by the threat-detection-agent life-cycle-management-block, a second threat-detection-agent, subsequent to the determination that the threat-detection-agent has experienced a failure.

FIG. 8 is a flow diagram illustrating a method 800 of performing threat management for a network having a distributed threat-detection framework. Method 800 includes providing 802 an SDN that includes a data plane, a control plane, and an application layer. An SDN is typically implemented with a combination of hardware and software. By way of example, and not limitation, an SDN may include network gateways, data switches, storage devices, computational resources such as computers, and non-transitory instructions that when executed by various computational resources cause those computational resources to perform actions in accordance with method 800. An SDN may be implemented such that some of its components are virtualized rather than physical.

Method 800 further includes detecting 804, by a threat-detection-agent, a threat in a local node, wherein the local node is associated with the threat-detection-agent, transmitting 806, by the threat-detection-agent, a detected-threat-information-message, and receiving 808, by a threat-detection-manager, the detected-threat-information-message. Method 800 continues by performing 810, by the threat-detection-manager, a threat analysis based at least in part on the detected-threat-information-message, transmitting 812, by the threat-detection-manager, a threat analysis report, and receiving 814, by a network-management-block, the threat analysis report. Method 800 further continues by performing 816, by the network-management-block, a threat-resolving reconfiguration, and transmitting 818, by the network-management-block, a threat-response-acknowledgement-message.

FIG. 9 is a flow diagram illustrating a method 900 of security enhancement for a network gateway in a network having a distributed threat-prevention framework. Method 900 includes providing 902 an SDN that includes a data plane, including a network-gateway-based threat-detection-agent, a control plane, and an application layer. An SDN is typically implemented with a combination of hardware and software. By way of example, and not limitation, an SDN may include network gateways, data switches, storage devices, computational resources such as computers, and non-transitory instructions that when executed by various computational resources cause those computational resources to perform actions in accordance with method 900. An SDN may be implemented such that some of its components are virtualized rather than physical.

Method 900 further includes detecting 904, by the network-gateway-based threat-detection-agent, a threat at a first network gateway, the first network gateway having a first network infrastructure and a first set of properties. Method 900 continues by making a determination 906, by the network-gateway-based threat-detection-agent, as to whether one or more other network gateways of a first portion of the network have network infrastructure and properties within a predetermined threshold of the first network infrastructure and first set of properties. Method 900 further includes installing 908, by the network-gateway-based threat-detection-agent, additional security packages at the first network gateway subsequent to the determination that one or more other network gateways of the first portion of the network have network infrastructure and properties within the predetermined threshold of the first network infrastructure and first set of properties, wherein the additional security packages are obtained from the one or more other network gateways of the first portion of the network that have network infrastructure and properties within the predetermined threshold of the first network infrastructure and first set of properties. Method 900 still further includes transmitting 910, by the network-gateway-based threat-detection-agent, a threat-report-message subsequent to the determination that no other network gateways of the first portion of the network have network infrastructure and properties within the predetermined threshold of the first network infrastructure and first set of properties.

Figure 10:
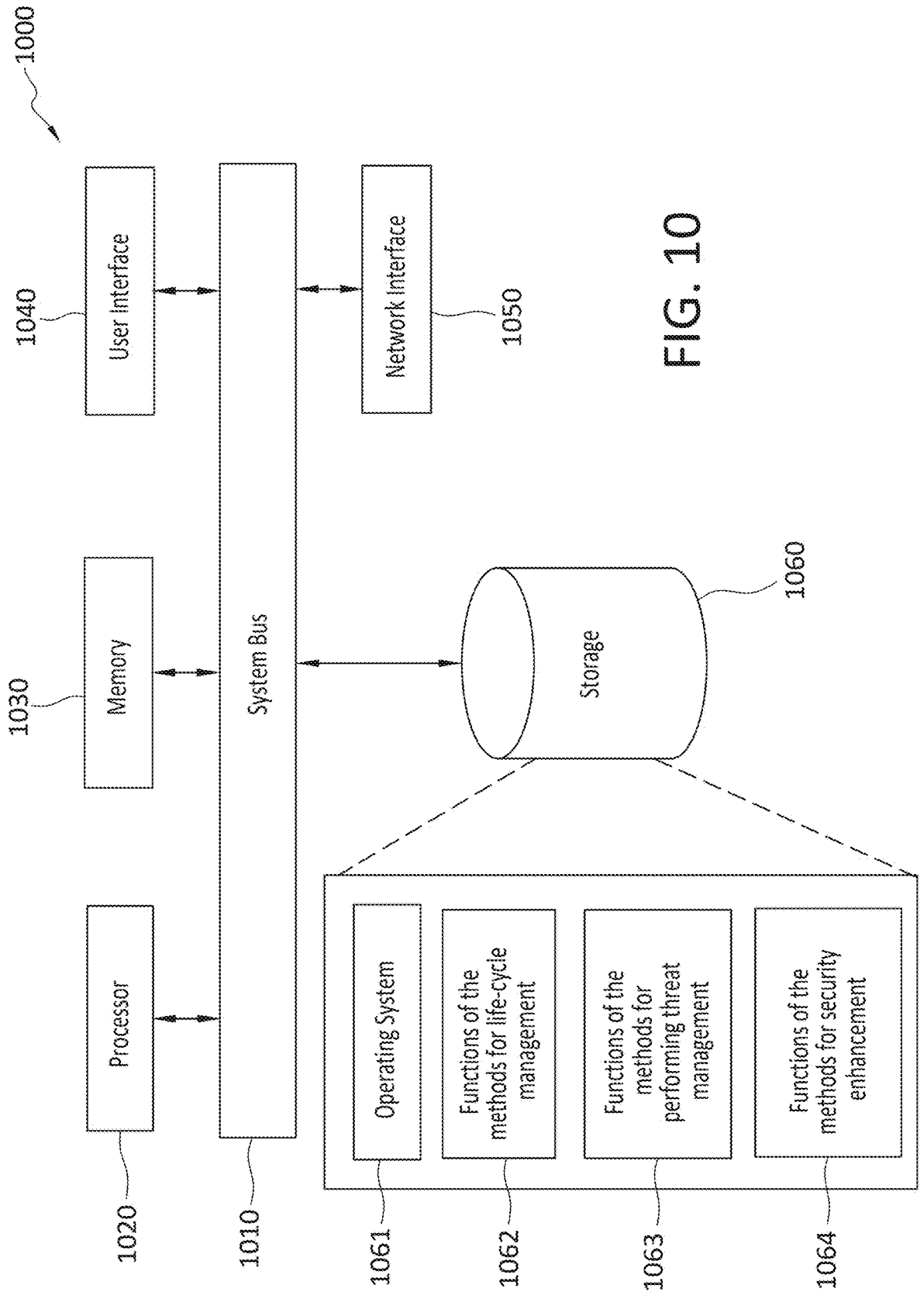
FIG. 10 is a high-level block diagram of a computer system in accordance with this disclosure.

FIG. 10 shows an illustrative hardware diagram of a system 1000 for implementing at least portions of various embodiments described herein. As shown, system 1000 includes a processor 1020, a memory 1030, a user interface 1040, a network interface 1050, and a storage subsystem 1060 communicatively coupled via one or more system buses 1010. It will be understood that FIG. 10 constitutes, in some respects, an abstraction and that the actual organization of the components of system 1000 may be more complex than illustrated.

Processor 1020 may be any hardware device capable of executing instructions stored in memory 1030 or storage subsystem 1060, or otherwise processing data. As such, processor 1020 may include a microprocessor, microcontroller, graphics processing unit (GPU), digital signal processor (DSP), neural network processor, field programmable gate array (FPGA), application-specific integrated circuit (ASIC), or other similar devices or combination of devices.

Memory 1030 may include various memories such as, for example L1, L2, or L3 cache or system memory. As such, memory 1030 may include static random-access memory (SRAM), dynamic RAM (DRAM), non-volatile memory (e.g., flash memory), read only memory (ROM), or other similar memory devices, or various combinations of some or all of the foregoing memory types.

User interface 1040 may include one or more devices for enabling communication with a user. For example, user interface 1040 may include a display, a touch interface, a voice interface, a mouse, and/or a keyboard for receiving user commands. In some embodiments, user interface 1040 may include a command line interface or graphical user interface that may be presented to a remote terminal via network interface 1050.

Network interface 1050 may include one or more devices for enabling communication with other hardware devices. For example, network interface 1050 may include a network interface card (NIC) configured to communicate according to the Ethernet protocol or other communications protocols, including wireless protocols. Additionally, network interface 1050 may implement a TCP/IP stack for communication according to the TCP/IP protocols. Various alternative or additional hardware or configurations for network interface 1050 will be apparent.

Storage subsystem 1060 may include one or more machine-readable storage media such as read-only memory (ROM), random-access memory (RAM), magnetic disk storage media, optical storage media, flash-memory devices, or similar storage media. In various embodiments, storage subsystem 1060 may store instructions for execution by processor 1020 or data upon which processor 1020 may operate. For example, storage subsystem 1060 may store a base operating system 1061 for controlling various basic operations of system 1000. Storage subsystem 1060 may include storage 1062 that includes software that when executed implements the functions of the methods for life-cycle management. Storage subsystem 1060 may further include storage 1063 that includes software that when executed implements the functions for performing threat management. Storage subsystem 1060 may further include storage 1064 that includes software that when executed implements the functions for security enhancement.

Memory 1030 and storage subsystem 1060 may both be considered to be "non-transitory machine-readable media." As used herein, the term "non-transitory" will be understood to exclude transitory signals but to include all forms of storage, including both volatile and non-volatile memories.

System bus 1010 allows communication between processor 1020, memory 1030, user interface 1040, storage subsystem 1060, and network interface 1050.

System 1000 is shown as including one of each described component, however, the various components may be duplicated in various embodiments. For example, processor 1020 may include multiple microprocessors that are configured to independently execute the methods described herein or are configured to perform steps or subroutines of the methods described herein such that the multiple processors cooperate to achieve the functionality described herein. Further, where system 1000 is implemented in a cloud computing system, the various hardware components may belong to separate physical systems. For example, processor 1020 may include a first processor in a first server and a second processor in a second server.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "nominal/nominally" refers to a desired, or target, value of a characteristic or parameter for a component or a process operation, set during the design phase of a product or a process, together with a range of values above and/or below the desired value. The range of values can be due to slight variations in manufacturing processes or tolerances.

As used herein, the term "about" indicates the value of a given quantity may vary from its nominal value based on, for example, various manufacturing tolerances. By way of example, and not limitation, the term "about" may indicate the cited value of a given quantity may vary within, for example, 1-30% of the value (e.g., ±0.5%, ±1%, ±5%, ±10%, ±20%, or ±30% of the value). Specific ranges are provided herein when needed.

Unless stated otherwise, terms such as "first" and "second" are used to arbitrarily distinguish between the elements such terms describe. Thus, these terms are not necessarily intended to indicate temporal or other prioritization of such elements.

It should be appreciated by those skilled in the art that any block diagrams herein represent conceptual views of illustrative hardware embodying the principles of the aspects.

While each of the embodiments are described above in terms of their structural arrangements, it should be appreciated that the aspects also cover the associated methods of using the embodiments described above.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the subjacent claims.

What is claimed is:

1. A method of life-cycle management for a threat-detection-agent at a network gateway node, comprising:

providing a software-defined network (SDN) comprising:
  a data plane,
  a control plane, and
  an application layer, including a threat-detection-agent life-cycle-management-block;

deploying, by the threat-detection-agent life-cycle-management-block of the application layer, a first threat-detection-agent, wherein the first threat-detection-agent is associated with at least one network gateway of the data plane;

receiving, by the threat-detection-agent life-cycle-management-block of the application layer a health-statistics report from the first threat-detection-agent, wherein the health-statistics report indicates a health of the first threat-detection agent;

making a determination, by the threat-detection-agent life-cycle-management-block of the application layer, based at least in part on the health-statistics report, whether the first threat-detection-agent has experienced a failure; and deploying, by the threat-detection-agent life-cycle-management-block of the application layer, a second threat-detection-agent, subsequent to the determination that the first threat-detection-agent has experienced a failure, wherein the second threat-detection-agent is associated with at least one network gateway of the data plane.

2. The method of claim 1, further comprising:

receiving, by the threat-detection-agent life-cycle-management-block of the application layer, a deployment status report from the first threat-detection-agent.

3. The method of claim 1, further comprising:

terminating, by the threat-detection-agent life-cycle-management-block, the first threat-detection-agent.

4. The method of claim 1, wherein the health-statistics report includes uptime of the first threat-detection-agent.

5. A method of performing threat management for a network having a distributed threat-detection framework, comprising:

providing a software-defined network (SDN) comprising:
    a data plane,
    a control plane, and
    an application layer;

detecting, by a threat-detection-agent, a threat in a local node, wherein the local node is associated with the threat-detection-agent;

transmitting, by the threat-detection-agent, a detected-threat-information-message;

receiving, by a threat-detection-manager, the detected-threat-information-message;

performing, by the threat-detection-manager, a threat analysis based at least in part on the detected-threat-information-message;

transmitting, by the threat-detection-manager, a threat analysis report;

receiving, by a network-management-block, the threat analysis report;

performing, by the network-management-block, a threat-resolving reconfiguration; and transmitting, by the network-management-block, a threat-response-acknowledgement-message.

6. The method of claim 5, wherein the detected-threat-information-message is transmitted over a first control channel to an SDN controller, and the SDN controller transmits the detected-threat-information-message over a second control channel to the threat-detection-manager.

7. The method of claim 5, wherein the threat-detection-manager operates within the application layer of the SDN.

8. The method of claim 7, wherein an SDN controller operates within the control plane of the SDN, the threat-detection-manager operates within an application layer of the SDN, and the network-management-block operates within the application layer of the SDN.

9. The method of claim 8, further comprising:

receiving, by the threat-detection-agent, the threat-response-acknowledgement-message.

10. A method of security enhancement for a network gateway in a network having a distributed threat-prevention framework, comprising:

providing a software-defined network (SDN) comprising:
    a data plane, including a network-gateway-based threat-detection-agent, a control plane, and
    an application layer;

detecting, by the network-gateway-based threat-detection-agent, a threat at a first network gateway, the first network gateway having a first network infrastructure and a first set of properties;

making a determination, by the network-gateway-based threat-detection-agent, as to whether one or more other network gateways of a first portion of the network have network infrastructure and properties within a predetermined threshold of the first network infrastructure and first set of properties;

installing, by the network-gateway-based threat-detection-agent, additional security packages at the first network gateway subsequent to the determination that one or more other network gateways of the first portion of the network have network infrastructure and properties within the predetermined threshold of the first network infrastructure and first set of properties, wherein the additional security packages are obtained from the one or more other network gateways of the first portion of the network that have network infrastructure and properties within the predetermined threshold of the first network infrastructure and first set of properties; and transmitting, by the network-gateway-based threat-detection-agent, a threat-report-message subsequent to the determination that no other network gateways of the first portion of the network have network infrastructure and properties within the predetermined threshold of the first network infrastructure and first set of properties.

11. The method of claim 10, further comprising:

receiving, by a threat-detection-manager, the threat-report-message; and making a determination, by the threat-detection-manager, as to whether one or more other network gateways of a second portion of the network have network infrastructure and properties within a predetermined threshold of the first network infrastructure and first set of properties.

12. The method of claim 11, further comprising:

installing, by the threat-detection-manager, one or more additional security packages at the first network gateway subsequent to the determination that one or more other network gateways of the second portion of the network have network infrastructure and properties within the predetermined threshold of the first network infrastructure and first set of properties, wherein the one or more additional security packages are obtained from the one or more other network gateways of the second portion of the network that have network infrastructure and properties within the predetermined threshold of the first network infrastructure and first set of properties.

13. The method of claim 12, wherein the first network gateway is a physical network gateway.

14. The method of claim 13, wherein the first network gateway is a virtual network gateway.

15. A software-defined-network (SDN), comprising:

a data plane including one or more network gateways;

a control plane including one or more SDN controllers, wherein at least a first portion of the one or more network gateways are communicatively coupled to a first one of the one or more SDN controllers, and each SDN controller of the one or more SDN controllers is communicatively coupled to a controller-based threat-detection-agent; and an application layer, including a threat-management-block, wherein the threat-management-block is communicatively coupled to at least one of the one or more SDN controllers, wherein a network-gateway-based threat-detection-agent is communicatively coupled to the one or more network gateways, and the network-gateway-based threat-detection-agent is configured to provide a health-statistics report indicative of a health of the network-gateway-based threat-detection-agent itself.

16. The SDN of claim 15, wherein at least a portion of the one or more network gateways are physical network gateways.

17. The SDN of claim 15, wherein at least a portion of the one or more network gateways are virtual network gateways.

18. The SDN of claim 15, wherein the threat-management-block includes a threat-detection-manager.

19. The SDN of claim 18, wherein the threat-management-block further includes a threat-detection-agent-life-cycle-management-block, wherein the threat-detection-agent-life-cycle-management-block is configured to receive the health-statistics report indicative of the health of the network-gateway-based threat-detection-agent itself.

20. A non-transitory computer-readable medium comprising instructions to enable provision of a software-defined network (SDN) having a distributed threat-prevention framework, the instructions when executed by a processor cause the processor to:

configure a network having a plurality of network gateways in a data plane of the network, one or more SDN-controllers in a control plane of the network, and a threat-management-block in an application layer of the network;

instantiate, within the data plane of the network, at least one network-gateway-based threat-detection-agent that is associated with at least a first one of the plurality of network gateways; and instantiate, within a control plane of the network, at least one SDN-controller-based threat-detection-agent that is associated with at least a first one of the one or more SDN-controllers, wherein the at least one network-gateway-based threat-detection-agent is configured to detect threats and coordinate information within the data plane, and the at least one SDN-controller-based threat-detection-agent is configured to detect threats and coordinate information within the control plane, wherein the at least one network-gateway-based threat-detection-agent is configured to provide a health-statistics report indicative of a health of the network-gateway-based threat-detection-agent itself.

21. The non-transitory computer-readable medium of claim 20, wherein at least a first one of the one or more SDN-controllers manages, controls, and provisions a data plane with a set of application-layer services.

22. The non-transitory computer-readable medium of claim 20, wherein the threat-management-block manages the at least one SDN-controller-based threat-detection-agent, and manages the at least one network-gateway-based threat-detection-agent.

23. The non-transitory computer-readable medium of claim 22, wherein the threat-management-block includes a threat-detection-agent-life-cycle-management-block, and further includes a threat-detection-manager.

24. The non-transitory computer-readable medium of claim 23, wherein the threat-detection-agent-life-cycle-management-block is configured to receive, from at least one control channel, a health-statistics report from the at least one network-gateway-based threat-detection-agent.

* * * * *